Jan. 2, 1968   E. ERB ET AL   3,361,531
REMOVAL OF OXYGEN FROM GAS MIXTURES
Filed Feb. 27, 1967
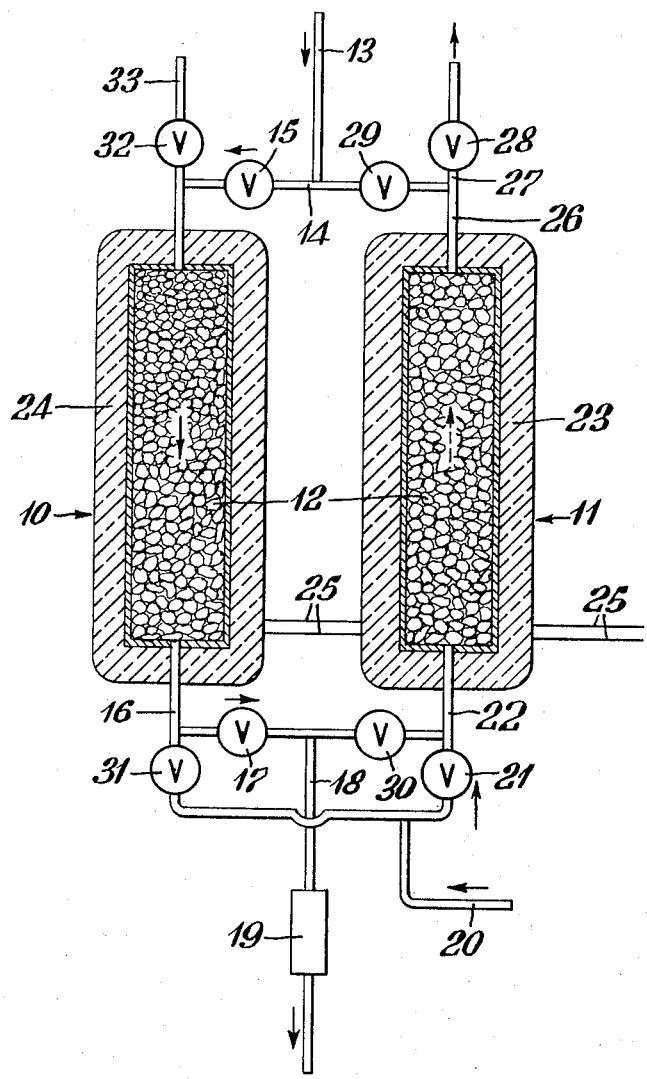
INVENTORS
ADAM H. MALIK
EZRA ERB
BY John C. Le Fever
ATTORNEY

United States Patent Office 3,361,531
Patented Jan. 2, 1968

3,361,531
REMOVAL OF OXYGEN FROM GAS MIXTURES
Ezra Erb, Fords, N.J., and Adam H. Malik, Lancaster, N.Y., assignors to Union Carbide Corporation, a corporation of New York
Filed Feb. 27, 1967, Ser. No. 632,131
21 Claims. (Cl. 23—204)

ABSTRACT OF THE DISCLOSURE

Copper, manganese or iron carbonate is reduced to an oxide compound and used to absorb oxygen at ambient temperature.

Cross-reference to related application

This is a continuation-in-part application of copending Serial No. 330,959, filed December 16, 1963, now abandoned.

Brief summary of invention

This invention relates to the removal of oxygen from oxygen-containing environments and gas mixtures by absorption in a solid material contact mass, a method for preparing this improved oxygen absorbent, and the novel absorbent itself.

There have been numerous absorption systems proposed and used for removal of oxygen from gas mixtures, but each is characterized by important limitations. For example, certain systems require elevated temperatures for effective removal and this requires additional heating equipment if the feed gas is available at ambient temperature. Moreover, the purified feed gas may be needed at ambient temperature so that cooling means must be supplied after the absorption step.

Another disadvantage of prior art oxygen removal systems is their inability to provide an oxygen-free product gas without the addition of other impurities from this removal, e.g., water vapor and hydrogen when hydrogen gas is used to remove oxygen by a combination process. Certain end uses of the product gas require virtually complete removal of oxygen traces without the simultaneous introduction of other impurities, as for example nitrogen gas for special crystal growing systems, and argon gas used in quantitative spectrographic analyzers to detect impurities in iron and steel alloys. Any appreciable amount of oxygen or other impurities in the gases, i.e., greater than about 1.0 p.p.m., often makes them virtually useless for such purposes.

Still another limitation of previously employed oxygen absorbents is their tendency to pulverize rather easily and cause powder carryover from the absorbent chamber into the product gas system. Exclusive of this contamination problem, attrition of the absorbent reduces the overall efficiency of the process. For example, natural ores such as manganese oxide tend to break up, which produces excessive pressure drop, flow channeling through the absorbent bed, and difficulty in retaining the small particles within the absorbent chamber.

One object of this invention is to provide an improved process for removing oxygen from an oxygen-containing environment by contact with a solid absorbent mass at ambient temperature.

Another object of this invention is to provide an improved process for removing oxygen from gas mixture by contact with a solid absorbent mass at ambient temperature in acceptably low contact times, and to the extent that the resulting product gas contains no more than about 0.1 p.p.m. oxygen.

Still another object is to provide a method for preparing a solid absorbent body having the characteristics of virtually complete oxygen removal at ambient temperature, reasonably high oxygen loading capacity, high resistance to attrition, and easy regenerability.

A further object is to provide an improved oxygen absorbent body having the aforementioned characteristics.

These and other objects will be apparent from the ensuing disclosure and appended claims.

The single figure is a schematic diagram of suitable apparatus for practicing the present invention.

According to the broadest aspects of the invention, a process is provided for removing oxygen from an oxygen-containing environment by first providing a compound selected from the group consisting of copper carbonate, manganese carbonate and iron carbonate. The selected compound is contacted with a hydrogen-containing gas at elevated temperature below 500° C. to reduce the carbonate to an oxide compound. The latter is contacted with the oxygen-containing environment at substantially ambient temperature thereby absorbing the oxygen and oxidizing the oxide compound. In this statement of the invention, the "oxygen-containing environment" may be an evacuated space containing only trace quantities of oxygen, so that the oxygen-oxide compound contact is in a static system or such environment may be a feed gas mixture flowing through a bed of the oxide compound to provide a dynamic system.

According to a preferred embodiment, a process is provided for removing oxygen from a feed gas mixture by means of a bed of shaped compact bodies composed of a member selected from the group consisting of copper carbonate, manganese carbonate and iron carbonate, and a mineral clay binder. The bed is first contacted with a hydrogen-containing gas at elevated temperature below about 500° C. thereby reducing the selected carbonate to an oxide compound. Next, the bed is purged with an inert gas to remove the residual hydrogen. The feed gas mixture is thereafter contacted with the oxide compound-containing bed at substantially ambient temperature thereby absorbing the oxygen and oxidizing the oxide compound to a higher cationic valence state. The purified product gas and the oxidized bed are then separated and the product gas used as desired. Following loading of the oxide bed with oxygen to the desired level, reactivation may be achieved by conventional means if desired. For example, reduction with an annealing gas mixture consisting of hydrogen and an inert gas such as nitrogen or argon at temperature of about 500° C. has been found satisfactory.

Detailed description

Manganous oxide is known to react with oxygen at ambient temperature and has been used as an absorbent in various forms. For example, manganous oxide (MnO) may be obtained from the reduction of manganese dioxide ($MnO_2$) with hydrogen. However, this source of manganous oxide is characterized by prohibitively low oxygen loadings and must be regenerated frequently unless enormously large beds are used. Moreover, it generally exists in the powder form which is too finely divided for commercial systems involving gas flow through large fixed beds.

In an attempt to avoid these problems, manganese dioxide powder was dispersed on shredded asbestos and packed in a tube. During the reduction to MnO the mixture sintered. However, when the bed was cooled a slight shrinkage occurred with the result that the bed separated from the walls of the tube exposing only the outer surface of the sintered asbestos-MnO mass to gases flowing through the tube. As a consequence, the oxygen loading was prohibitively low.

A commercially available catalyst consisting of alumina pellets impregnated with manganese dioxide and copper oxide was tested, but exhibited poor loading of oxygen.

Also, there was considerable dusting, resulting from attrition.

It has been unexpectedly discovered that remarkably high oxygen absorption capacities are afforded by oxides of copper, manganese and iron when prepared by reduction of the corresponding carbonate compound. This phenomena is believed due to release of the relatively large carbon dioxide molecule which probably structurally changes and opens up the compound's lattice arrangement leaving voids larger than oxygen atoms, thus increasing its surface area. Thus, the copper, manganese and iron compounds become far more active as oxygen absorbents. This probable change of lattice structure does not occur when cuprous, manganous and ferrous oxide are prepared by other methods; their structure remains closed thereby accounting for relatively poor oxygen loading capacity.

Contrary to our expectations, it has also been discovered that the opened lattice structure of these particular cuprous, manganous and ferrous oxides may be formed in the presence of a mineral clay compound, and that a shaped compact body of high attrition resistance may be prepared from such mixtures which possesses this high oxygen absorptive capacity. Accordingly, another embodiment of this invention contemplates a method for preparing an improved absorbent body comprising the steps of initially providing a first mixture of a member selected from the group consisting of copper carbonate, manganese carbonate and iron carbonate, and about 5 to 25% mineral binder, and thoroughly mulling the constituents. About 20% to 30 wt. percent water is then added and mixed to prepare a second mixture. If desired, a shaped compact body is then formed from the second mixture. In any event the second mixture is dried to about 1 to 3 wt. percent water. The dried second mixture is thereafter contacted with a hydrogen-containing gas at elevated temperature below about 500° C. for sufficient duration to convert the selected carbonate to an oxide compound. That the resulting adsorbent body possesses both the previously discussed open lattice structure and high attrition resistance was surprising, since one might expect the bodies to break up or blow apart by virtue of the carbon dioxide release during the hydrogen reduction or activation step. It was found that the cuprous, ferrous and manganous oxide-clay bound bodies possess virtually the same attrition resistance as the corresponding carbonate bodies prior to reduction. Moreover, the physical stability of the oxide bodies is not noticeably affected by repeated activations.

Examples of mineral clays which may be employed for bonding the copper, manganese or iron compounds without substantially altering the absorptive properties of the oxides are attapulgite, kaolin, sepiolite, polygarskite, kaolinite, plastic ball clays, clays of the attapulgite or kaolin types, bentonite, montmorillonite, illite, chlorite, and bentonite-type clay. One requirement of the mineral clays used in this invention is that the bonded shaped compact body maintains its strength when heated repeatedly to high temperatures up to about 500° C. for periodic regeneration by reduction of the oxide to a lower cationic valence state. Also, the clay should be semi-plastic or plastic in the presence of water at atmospheric temperatures to permit compacting and shaping, and capable of acquiring a substantial "green" strength upon exposure for short periods of time to elevated temperature drying conditions.

Among the mineral clay binders, bentonite afforded the strongest oxygen absorbent bodies, and is the preferred binder material for the manganese and iron compounds. A series of tests were performed in which pellets were prepared using representative types of mineral clays, i.e. (1) Avery clay representing the halloysite type of kaolin, (2) a kaolinite characterized by a hexagonal plate structure, and (3) an attagel representing the attapulgus group. Samples of the clays were mixed with 90% $MnCO_3$ by weight, extruded to $\frac{1}{16}$-inch diameter pellets, and dried to about 2 wt. percent water content by contact with air at about 100° C. The strength of the resulting pellets was roughly determined by manual inspection and found to be satisfactory for further handling.

When copper or manganese carbonate is employed, the mineral clay binder should comprise between about 5 and 25 wt. percent of the first mixture. Less than about 5 wt. percent clay does not provide sufficient plasticity for shaping nor a sufficiently strong absorbent body, and more than about 25 wt. percent clay does not appreciably improve the body strength and unnecessarily dilutes the body. That is, the mineral clay binder does not itself act as an oxygen absorbent. For iron carbonate, at least 10% mineral clay binder is needed so that a mineral clay binder content of 10–25 wt. percent is suitable for all three carbonates. A bentonite content of about 10 wt. percent is preferred with iron and manganese carbonate, as affording both satisfactory body strength and high bulk adsorption capacity. With copper carbonate, 5 wt. percent bentonite-5 wt. percent Avery clay is preferred for the same reasons.

The copper, manganese or iron carbonate and the clay mineral binder (if employed) are mulled for sufficient duration to obtain uniform distribution of the components. As used herein, "mulling" refers to the powdering, pulverizing, crushing, or grinding of the components so that the individual particles of the mulled first mixture are small enough to pass through a 50 U.S. standard mesh screen. This is necessary for intimate contact between the carbonate and mineral clay components, and to permit the subsequent forming of a compact body. It has been found that the mulling periods of about 30 minutes are sufficient to reach this desired state of intimate contact.

After mulling of the first mixture, sufficient water is added to provide a second mixture having between about 20 and 30 wt. percent water. The latter is uniformly dispersed in the carbonate-clay binder mixture to prepare a shapeable mass. If less than 20 wt. percent water is added, the mass does not possess sufficient fluidity for easy shaping, as for example by extrusion. On the other hand, more than about 30 wt. percent water results in an excessively fluid mix which will not retain its shape. About 25 wt. percent water is preferred as an optimum balance between these extremes.

In forming the second mixture into a compact body, any of several techniques may be used, as for example molding, extruding, tumbling, drum-rolling, casting, slip-casting, disk-forming, belt-forming, prilling, tableting and briquetting. The following are illustrative of possible shapes of the oxygen absorbent mass: beads, spheres, pellets, tablets, sheets, flakes, briquettes, granules, cylinders, tubes, disks, partitions, toroids, cubes and blocks. Before conducting the shaping step, it may be desirable to intermix small amounts of other materials such as lubricants, extrusion aids, gelling or thickening agents, surface active agents and the like.

After the shaping step, the shaped compact bodies are dried at a suitable elevated temperature, e.g., 100° C. to reduce the water content to about 1–3 wt. percent. Drying may, for example, be performed in an externally fired oven.

The dried, shaped bodies may then be broken into smaller particles if desired, or alternatively placed in a reactor for contact with a hydrogen-containing gas at elevated temperature below about 500° C. If higher temperatures are employed, the reduced copper, iron or manganese oxide-clay binder mass may sinter, i.e., coalesce. This is to be avoided because sintering tends to close the voids created by release of carbon dioxide gas and necessary for high oxygen absorption capacity. Suitable contact temperature for this reduction are 350° C. to 500° C. for the manganese carbonate body, and about 500° C. for the iron carbonate body. With copper carbonate a contact temperature of 150° C. to 200° C.

is preferred thereby affording a significant advantage over the iron and manganese embodiments which require higher temperatures for this step.

These temperature ranges provide sufficient heat for reasonably rapid reduction but avoid the sintering problem. In order to provide a closely controllable reduction reaction, it is usually preferable to dilute the hydrogen with an inert gas, as for example nitrogen. A reducing gas atmosphere of 15% hydrogen-85% nitrogen has been found particularly satisfactory.

The importance of controlling the carbonate reduction temperature was illustrated in a series of tests in which manganese carbonate was reduced to manganous oxide with hydrogen-nitrogen mixtures with the hydrogen concentration ranging from 15% to 100%. In most of these tests the reduction was effected at temperatures below 500° C., but in one test the reduction was at 600–625° C. with 100% hydrogen gas. Sintering is believed to have occurred with the effect that a decreased available surface area of the MnO bed resulted in lower oxygen loading. These tests are summarized in Table A.

the former being preferred because of greater availabiilty. Attempts were made to follow the course of reduction of the copper carbonate-copper hydroxide system by isolating the by-products in cold traps and measuring them. Based on the products isolated, the reduction appeared to proceed as follows:

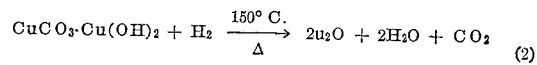

Based on the $CO_2$ isolated, the reaction was about 90% complete. The water which was isolated corresponded to 30% more than theoretical and was attributed to oxidation of the bed by an air leak during the activation. Subsequent reduction of the oxidized bed produced the water.

Prior to hydrogen activation the $CuCO_3 \cdot Cu(OH)_2$ masses were heated to 170° C. in an argon atmosphere. No $CO_2$ was isolated and only 2.6 wt. percent water was measured. This value corresponds to the normal moisture content of the clay masses after explosure to ambient air following extrusion and drying.

TABLE A.—EFFECT OF REDUCTION TEMPERATURE

| Initial Mass | Cycle | C.f. O₂/lb. Initial Mass | Contact Time (Sec.) | Feed gas, Percent O₂ | Reduction Temperature (° C.) |
|---|---|---|---|---|---|
| MnCO³, 5% bentonite | 1 | 0.119 | 63 | 1.05 | 500 |
|  | 2 | 0.096 | 68 | 1.05 | 500 |
|  | 3 | 0.096 | 68 | 1.05 | 500 |
|  | 4 | 0.071 | 62 | 1.05 | 600–625 |
|  | 5 | 0.064 | 66 | 1.05 | 500 |
|  | 6 | 0.061 | 63 | 1.05 | 500 |
| MnCO³, 10% bentonite | 1 | 0.104 | 61 | 0.93 | 500 |
|  | 2 | 0.099 | 56 | 0.93 | 500 |
|  | 3 | 0.085 | 55 | 0.93 | 500 |
|  | 4 | 0.088 | 61 | 0.93 | 500 |
|  | 5 | 0.091 | 123 | 0.93 | 500 |
|  | 6 | 0.068 | 11 | 0.93 | 500 |

An inspection of the Table A data reveals that the absorptive capacity of the MnO bed dropped appreciably when the reduction temperature was raised from 500° C. to 600–625° C., demonstrating the probable sintering phenomenon and the temperature criticality: That this loss of capacity is not due to gradual buildup of residue after repeated cycling is apparent from the 10% bentonite tests. It will be noted that there was virtually no loss of capacity on the fourth cycle of the latter tests at a reduction temperature of 500° C. These experiments are discussed in greater detail with respect to Table B.

It has been found experimentally that the carbonate bodies may be heated from ambient temperature to the desired reduction temperature, e.g., 500° C. at rates as high as one hour. More rapid heating was not attempted due to equipment limitations.

The $MnCO_3 \rightarrow MnO$ reaction is, strictly speaking, a thermal decomposition. That is, $MnCO_3$ thermally decomposes to form MnO and $CO_2$ without reduction. However, before $CO_2$ can escape from the system, it is reduced to CO by the MnO which in turn is oxidized to $Mn_2O_3$. Thus, treatment with hydrogen at elevated temperature is necessary to convert $Mn_2O_3$ to MnO.

Relative to the iron carbonate reduction, a 15% hydrogen in nitrogen gas mixture was contacted with a 10% betonite-90% ferrous carbonate body at a temperature of about 500° C. From the amount of carbon dioxide and water isolated as by-products, the following reaction probably took place:

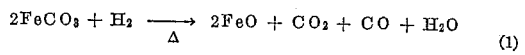

The copper carbonate is commercially available in two forms; malachite $(CuCO_3 \cdot Cu(OH)_2)$; and azurite

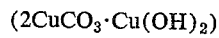

The major constituent of the oxygen-containing gas mixture may be either chemically inactive or active, the only limitation being that it does not react with the manganese or iron oxide absorbent mass, in preference to oxygen. From this standpoint the halogen gases such as chlorine and fluorine are excluded as are carbon dioxide and certain sulfur compounds, e.g., $H_2S$, $SO_2$. Among those major constituents which have been successfully purified by contact with a 90% manganous oxide-10% bentonite mass are the following: nitrogen, argon, hydrogen, methane and carbon monoxide. Alternatively the environment contacted with the reduced carbonate starting material may contain only oxygen.

The extent to which a particular oxide of manganese is formed by contact with oxygen depends on temperature, partial pressure of oxygen, and contact time. The oxides of manganese combine with oxygen according to the following equation:

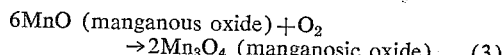

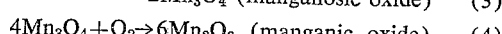

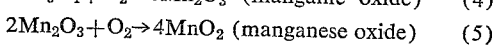

Although the reaction(s) involved in the present invention were not positively determined, it is believed that the ambient temperature oxidation is best described by Equation 3. Reactions 4 and 5 occur at higher temperatures.

A 90% ferrous oxide-10% bentonite mass was successfully used to absorb oxygen from air, and the reaction was probably as follows:

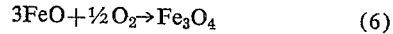

In the copper system, oxygen absorption is believed to be the reaction of oxygen with cuprous oxide to form cupric oxide. The expected color change was visually observed, that is, from a purple-red for $Cu_2O$ to black for CuO. The equation for this reaction is as follows:

$$Cu_2O + \tfrac{1}{2}O_2 \rightarrow 2CuO \tag{7}$$

A relationship apparently exists between the contact time and the resulting oxygen concentration in the product stream. For relatively short contact times, the absorbent may not have sufficient time to react chemically and thus remove all the oxygen present, but with longer contact times the oxygen may be removed to very low concentrations such as 0.1 p.p.m. or less. Also, for low oxygen concentrations in the feed gas stream, very low oxygen concentrations in the product gas can be achieved even with short contact times. Thus, in general, for a particular desired oxygen concentration in the effluent product stream, the contact time required is roughly inversely proportional to the oxygen concentration in the feed stream.

The invention will be more clearly understood from the following examples:

*Example 1*

A series of tests were conducted which illustrate the oxygen loading on different masses containing manganous oxide in various forms. In each case the mass weighed about one pound and occupied about 350 cubic centimeters in a reactor vessel. The vessel was kept vertical at all times and the $O_2$–$N_2$ gas flow was from top to bottom at about 200 cc./min. The absorption step was terminated when the oxygen content of the product gas rose to 1 p.p.m. Oxygen loading was calculated as cubic feet per pound of starting material—before reduction to MnO. The feed gas contact time was calculated from the experimental data as follows:

Contact time (sec.)
$$= \frac{\text{Volume of free space in reactor}}{\text{Volumetric flow (cc./sec.)}} \times \frac{\text{p.s.i.a.}}{14.7}$$

In most runs, the contact temperature was ambient. For the MnO-bentonite pellets obtained from $MnCO_3$, the same bed was reactivated prior to each oxygen absorption test by a nitrogen-hydrogen mixture at about 500° C. The data from these tests summarized in Table B.

of commercial usage. On this basis only the manganous oxide mass of this invention is satisfactory, and provides loadings at least twice that of the manganous oxide masses prepared from manganese dioxide as a starting material. Run 6 indicates that rhodochrosite, a manganese carbonate ore, is useful in this invention if mixed and mulled with a clay binder in the previously described manner.

*Example 2*

The Example 1 apparatus was used to evaluate removal of oxygen from various so-called active gas mixtures (i.e. not inert) by means of a 10% bentonite-90% manganese carbonate mass at ambient temperature. Reactivations of the one-lb. mass were conducted with a nitrogen-15% hydrogen mixture at about 500° C. Because of possible inaccuracies in the measurement of the oxygen concentration in a dynamic mixing system, oxygen loading of the mass was determined in two ways. The first was an estimated oxygen concentration established with the dynamic mixing system by which the feed gas was prepared. The second method was by measuring the water isolated during the subsequent regeneration reduction and translating this figure to the total oxygen absorbed. The results of these tests are summarized in Table C. The concentration of oxygen in mixtures with hydrogen, methane and carbon monoxide was reduced to a level no higher than 0.3 p.p.m. and probably lower.

TABLE C

| Feed Gas Mixture | Contact Time (sec.) | Cu. ft. $O_2$/lb. mass | |
|---|---|---|---|
| | | From inlet $O_2$ | From $H_2O$ by Reduction |
| 1% $O_2$ in commercial grade $H_2$ | 91 | 0.101 | 0.096 |
| 1% $O_2$ in commercial grade $CH_4$ | 108 | 0.060 | 0.062 |
| 0.5% $O_2$ in commercial grade CO | 94 | 0.053 | 0.045 |

In the course of the $O_2$ removal test by MnO in a carbon monoxide system, evidence was obtained that carbon dioxide, an impurity in carbon monoxide, was also removed by MnO at ambient temperature.

These tests clearly demonstrate that the present invention is useful for removal of oxygen from many gas mix- TABLE B.—$O_2$ LOADING ON VARIOUS MnO REACTOR MASSES

| Initial Mass | Cycle | C.f. $O_2$/lb. Initial Mass | Contact Time (sec.) | Feed gas, Percent $O_2$ | Remarks |
|---|---|---|---|---|---|
| (1) $MnO_2$, 10% bentonite | 1<br>2 | 0.031<br>0.042 | 14<br>45 | 1.05<br>0.1 | $MnO_2$ reduced to MnO by reduction with $H_2$. |
| (2) $MnO_2$, CuO impregnated on alumina. | 1 | 0.026 | 60 | 0.1 | Some powdering of mass from attrition. |
| (3) $MnO_2$, 10% bentonite calcined in air at 700° C. | 1 | 0.030 | 45 | 1.05 | 500 to 600° C. required for hydrogen reduction which was 65% complete. |
| (4) $MnO_2$, 5% bentonite | 1<br>2 | 0.020<br>0.017 | 72<br>37 | 1.05<br>1.05 | Same as (1). |
| (5) 60% $MnO_2$, 40% CuO | 1<br>2 | 0.005<br>0.005 | 42<br>42 | 0.93<br>0.93 | Considerable powdering from attrition. |
| (6) Rhodochrosite, 10% bentonite. | 1<br>2<br>3 | 0.058<br>0.021<br>0.045 | 47<br>4<br>85 | 0.93<br>(1)<br>(1) | |
| (7) $MnCO_3$, 5% bentonite | 1<br>2<br>3 | 0.119<br>0.096<br>0.096 | 63<br>68<br>68 | 1.05<br>1.05<br>1.05 | |
| (8) $MnCO_3$, 10% bentonite | 1<br>2<br>3<br>4<br>5 | 0.104<br>0.099<br>0.085<br>0.088<br>0.091 | 61<br>56<br>55<br>61<br>123 | 0.93<br>0.93<br>0.93<br>0.93<br>0.93 | |

1 0.93 and 54 p.p.m.

As a criteria for evaluation of the Table B data, an oxygen loading below about 0.05 cu. ft. $O_2$ per pound of starting material is undesirably low from the standpoint tures of virtually any chemical composition, e.g. all rare gases, hydrocarbons, carbon monoxide, nitrogen, and hydrogen.

Example 3

Compact pellets of 90% MnCO₃-10% bentonite have been used to remove oxygen traces from high purity nitrogen in a plant for crystal growing. The feed gas was processed at ambient temperature, a flow rate of about 3,000 c.f.h. NTP and contained 1–3 p.p.m. $O_2$. The effluent concentration of oxygen was below 0.1 p.p.m. and measured from 0.04 to 0.07 p.p.m. during one test. Initially, two 6 ft. by 5 in. O.D. reactors were used with 50 pounds of MnCO₃-10% bentonite pellets in each reactor to process about 70,000 cu. ft. per day of nitrogen feed gas for 10 to 14 days. Later, a larger reactor (6 ft. by 8⅝ inch. O.D.) was filled with 160 lbs. of the same pellets and used to obtain additional data. The contact time through the 5-inch reactors was about 1.6 seconds, and 4.6 seconds through the 8⅝ inch reactor. The data from these tests are summarized in Table D. The increased oxygen loading with the larger No. 3 reactor was 5.5 times that of the smaller Nos. 1 and 2 reactors. Of this difference, a factor of 2.5 is attributable to longer contact times since the quantity of pellets in the larger reactor was about 3 times that of the smaller reactors.

with Equation 1, the absorption in accordance with Equation 6 and the results of three cycles are summarized in Table E.

TABLE E

| Cycle | C.f. O₂/lb. Initial Mass | Contact Time (sec.) | Inlet Conc., Percent O₂ |
|---|---|---|---|
| 1 | 0.0026 | 63 | 0.0250 |
| 1 | 0.0709 | 63 | 0.65 |
| Total | 0.074 | | |
| 2 | 0.075 | 96 | 0.1 |
| 3 | 0.376 | 77 | 21. |

Although the absorption was initiated at ambient temperature, the Reaction 6 between ferrous oxide and oxygen is exothermic and raised the temperature of the bed. This probably explains the relatively high oxygen loadings which are comparable to the MnO, from MnCO₃ loadings at 150° C.

TABLE D

| Reactor and Cycle | C.f. N₂ Processed to 0.1 p.p.m. O₂ Breakthrough | C.f. O₂ Removed | C.f. N₂ Processed From 0.1 to 1 p.p.m. O₂ Breakthrough | Additional C.f. O₂ Removed | Total Loading C.f. O₂ per lb. MnCO₃ 10% Bentonite |
|---|---|---|---|---|---|
| No. 1, initial | 617,000 | 1.05 | 221,000 | 0.11 | 0.023 |
| No. 2, initial | 628,250 | 1.07 | 306,600 | 0.15 | 0.024 |
| No. 1, 2d [1] | 482,000 | 0.72 | | | |
| No. 2, 2d | 801,100 | 0.96 | 190,000 | 0.36 | 0.026 |
| No. 1, 3d [1] | [2] 512,500 | 1.3 | 145,100 | 0.15 | 0.029 |
| No. 2, 3d | 568,000 | 1.18 | 419,500 | 1.00 | 0.049 |
| No. 3, initial | 3,180,700 | 6.43 | 45,000 | 0.09 | 0.040 |

[1] Reactor was not fully reactivated.
[2] High O₂ concentrations (10 and 13 p.p.m.) were passed through reactor for several hours.

Example 4

In the manufacture of metals it is usually desirable to monitor the metal composition at various points in the process. For example, quantitative spectrographic analyzers are used in the manufacture of high silicon cast iron, and require high purity argon, argon containing 1 p.p.m. oxygen or less. In one plant it was found that commercial-grade high purity argon as supplied in argon containers was not satisfactory from this standpoint, and prevented proper operation of the "Quantovac" analyzer. To obviate this problem, 24 lbs. of 90% manganese carbonate-10% bentonite pellets were charged into a 3 foot long, 4 inch diameter reactor. The carbonate mass was then reduced to a lower valence state oxide, probably manganous, by contact with a 5 c.f.h. flow of 17% $H_2$ in argon at about 500° C. to produce 16 lbs. of oxide pellets. The reactor was then cooled to ambient, hydrogen removed to <1 p.p.m. by purging with argon, and placed in the argon feed conduit between the argon supply container and the "Quantovac" analyzer. The absorbent mass was so effective in removing oxygen from the argon feed gas at a contact time of about 20 seconds that the "Quantovac" analyzer then performed in a completely satisfactory manner.

Example 5

The suitability of iron carbonate as a starting material in the practice of this invention was demonstrated in a test in which one lb. of 10% bentonite and iron carbonate (FeCO₃) was extruded into 1/16-inch diameter pellets and packed into a reactor. The pellets occupied a volume of 315 cc. having an estimated free space of 160 cc. The initial reduction and subsequent reactivations were carried out with 15% hydrogen in nitrogen at a total flow of about 2 c.f.h. and temperature of about 500° C. The carbonate reduction reaction was probably in accordance

Example 6

A series of tests were conducted which illustrate preparation of a copper carbonate-clay mass, reduction to cuprous oxide, and use of an oxygen absorbent.

The first sample comprised 90 wt. percent $$CuCO_3 \cdot Cu(OH)_2$$

and 10 wt. percent bentonite which was mixed with sufficient water to form a second mixture containing 23 wt. percent $H_2O$. The resulting thick slurry tended to pack when extrusion was attempted. However, flakes were subsequently prepared quite easily. Additional water was added to the cake taken out of the extruder, to form a slurry having a consistency resembling thick paint. This second mixture was spread in a layer about 1/16 to 1/8-inch thick on sheets of aluminum foil, and dried to about 1–3 wt. percent water. The resulting flakes were crushed to pass through a 6-mesh screen and retained on an 8-mesh screen.

The second sample was prepared by providing a first mixture 80 wt. percent CuCO₃·Cu(OH)₂ and 20 wt. percent Avery clay which was mulled, followed by the addition of sufficient water to form a second mixture having a 33 wt. percent $H_2O$. The latter was hand-extruded into 1/16-inch pellets which were dried at 100° C. to about 1–3 wt. percent water.

To prepare the third sample, a portion of the first sample (90 wt. percent CuCO₃·Cu(OH)₂-10 wt. percent bentonite on a dry basis) was dried, ground and passed through a 200 mesh screen. To this portion was added an equal weight of 90 wt. percent CuCO₃·Cu(OH)₂-10 wt. percent Avery clay mixture, and the combination mixed with sufficient water to form a second mixture having about 20 wt. percent water. The second mixture was hand extruded into 1/16-inch pellets, dried at 110° C. and found to be sturdy.

The apparatus used for activation and reactivation of the three samples consisted of a reactor tube, furnace, temperature control device, and hydrogen and argon gas with the accompanying regulating equipment. Activation and reactivations of the first sample (flakes) were carried out in 1½-inch IPS x 10-inch long stainless steel vessels containing about a ¾ lb. charge.

Subsequent tests on the second and third samples (pellets) were conducted in glass tube reactors so that color changes accompanying the activations and $O_2$ loadings could be observed visually. The volume of the glass reactor was about 100 cc. and the starting metal carbonate bed weight ranged from 90 to 110 grams, depending on the sample tested. The reducing gas mixture for activations and reactivations was 10 to 15° hydrogen in argon at flows of 0.5 cu. ft. per hour through the glass reactor and 2 cu. ft. per hour through the stainless steel reactor. The activation temperature was about 150° C.—substantially below the temperatures needed for the iron and manganese compounds.

Oxygen loading tests were performed in the same vessels in which the hydrogen activations were conducted. Approximately 1% oxygen in argon was passed through the masses at ambient temperature (about 21° C.), and an oxygen analyzer was used to detect breakthrough, the $O_2$ concentration in the effluent from the masses being no greater than 0.1 p.p.m. while oxygen was absorbed. The results of these oxygen loading tests are summarized in Table F.

pared by a series of steps including mixing and then mulling. Next the mulled formulation was mixed with sufficient water to form a composition having 20 wt. percent $H_2O$, and extruded into 1/16-inch pellets which exhibited a high green strength. After drying at 110° C. to 1–3 wt. percent water, the pellets still exhibited good strength characteristics. The pellets were activated in the same stainless steel reactor described in Example 6, and a 10% hydrogen in nitrogen gas mixture was used for this step. The activation was carried out at three temperature levels up to 450° C. using a flow rate of 2 cu. ft. per hour. At this point activation was essentially complete as evidenced by the termination of water and carbon dioxide formation. The chemistry of the hydrogen activation is believed to be as follows:

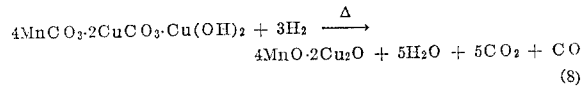

$$4MnCO_3 \cdot 2CuCO_3 \cdot Cu(OH)_2 + 3H_2 \xrightarrow{\Delta}$$
$$4MnO \cdot 2Cu_2O + 5H_2O + 5CO_2 + CO \quad (8)$$

The proportion of copper to manganese indicated in the equation approximately corresponds to a one-to-one weight basis of the respective carbonates.

The procedure used for the oxygen loading test was the same as described in Example 6, and the results are summarized in Table G. The loading of 0.15 cu. ft. $O_2$ per lb. of starting material was higher than that obtained with the manganous carbonate-10 wt. percent bentonite mass which was, after initial activation, 0.10 cu. ft. $O_2$ per lb.

TABLE F

| Initial Mass | Cycle | Cu. ft. $O_2$/lb. Initial Mass | Contact Time (Sec.) | Inlet Conc., Percent $O_2$ |
|---|---|---|---|---|
| $CuCO_3 \cdot Cu(OH)_2$, 10% Bentonite Flakes (Sample 1) | 1 | 0.23 | 90 to 185 | 0.56 |
| | 2 | 0.17 | 125 | 0.56 |
| | 3 | 0.16 | 125 | 0.56 |
| | 4 | 0.13 | 90 | 0.56 |
| | 5 | [1] 0.12 | 110 | 0.56 |
| | 6 | [1] 0.14 | 90 | 0.56 |
| $CuCO_3 \cdot Cu(OH)_2$, 20% Avery Clay Pellets (Sample 2) | 1 | 0.028 | 20 | 0.83 |
| | 2 | 0.054 | 60 | 0.83 |
| $CuCO_3 \cdot Cu(OH)_2$, 5% Bentonite, 5% Avery Clay Pellets (Sample 3) | 1 | 0.078 | 18 | 0.83 |
| | 2 | 0.096 | 16 | 0.83 |
| | 3 | 0.105 | 16 | 0.83 |
| | 4 | 0.083 | 16 | 0.83 |
| | 5 | 0.080 | 15 | 0.83 |
| | 6 | 0.080 | 17 | 0.83 |
| | 7 | 0.084 | 17 | 0.83 |
| | 8 | 0.052 | 11 | 0.83 |
| | 9 | 0.064 | 20 | 0.83 |
| | 10 | 0.072 | 10 | 0.83 |
| | [2] 11 | 0.048 | 27 | 0.83 |
| | 12 | 0.050 | 19 | 0.83 |
| | [3] 12 | 0.575 | 20 | 0.33 |

[1] Reactivation temperature 325° C.
[2] The 10th activation prior to the 11th loading was carried out at 400° C. The higher temperature seemed to have a deleterious effect on subsequent loadings at ambient.
[3] Additional loading at 150° C.

Inspection of Table F reveals that the oxygen loadings for each sample were commercially acceptable using as a criteria a loading of 0.05 cu. ft. $O_2$ per pound of starting material. Sample 1 provided the highest loadings but the contact times were also highest. Sample 2

($CuCO_3 \cdot Cu(OH)_2$-20% Avery clay)

gave the lowest loadings, possibly due to the relatively high clay content. Good loadings were obtained with the bentonite-Avery clay bound pellets at comparatively short contact times, and this represents the preferred copper embodiments of the invention.

*Example 7*

Pellets of the composition 45 wt. percent manganous carbonate ($MnCO_3$)-45 wt. percent copper carbonate [$CuCO_3 \cdot Cu(OH)_2$]-10 wt. percent bentonite were pre-

TABLE G

| Initial Mass | Cu. ft. $O_2$/lb. Initial Mass | Contact Time (Sec.) | Inlet Conc., Percent $O_2$ |
|---|---|---|---|
| 45% $CuCO_3 \cdot Cu(OH)_2$, 45% $MnCO_3$, 10% Bentonite Pellets | 0.15 | 108 | 0.19 |

The copper, manganese or iron oxide bodies may be reactivated in situ, or alternatively may be periodically removed and replaced by a fresh charge. The oxygen-loaded bodies may then be discarded or reactivated by elevated temperature contact with a hydrogen-containing gas at a central plant.

The figure illustrates a continuously operating, on-site absorption-reactivation system employing two reactors 10 and 11 piped in parallel flow relationship. Each reactor may, for example, comprise a 3-foot section of 8-inch diameter pipe closed at each end, and each charged with 80 lb. of MnCO$_3$-10% bentonite pellets 12. In this system each unit would be capable of processing about 1.5 million cu. ft. of feed gas having an oxygen concentration of 2–3 p.p.m. The feed gas is introduced at ambient temperature through conduit 13, branch conduit 14 and control valve 15 therein to reactor 10. The oxygen content of this feed gas is substantially completely absorbed by the MnO-bentonite mass and discharged through the lower end through conduit 16 and flow control valve 17 to connecting product gas conduit 18. The latter preferably contains filter 19 having small enough openings, e.g. 2 microns, to prevent the passage of dusted MnO absorbent. The oxygen-depleted product gas is discharged through conduit 18 for further use as desired.

Assuming that the absorbent mass 12 in reactor 11 has been previously loaded with oxygen, the oxidized mass may be regenerated by reduction of the manganese cation to a lower valence state, i.e. MnO, using about 25–50 cu. ft. hydrogen and 200 cu. ft. of an inert gas, e.g. nitrogen per activation. This regenerating gas mixture is introduced through conduit 20 and control valve 21 to connecting conduit 22 leading to the lower end of reactor 11. Both reactors 10 and 11 are provided with suitable means for regenerative heating of the absorbing mass, as for example quartz shields 23 and 24, respectively. Thus, to regenerate reactor 11, quartz shield 23 is heated by means of electric power leads 25 to an appropriate elevated temperature, e.g. 500° C.

The hydrogen-containing regenerating gas flows upwardly through heated mass 12 thereby reducing same for further use as an oxygen absorbent mass. The resulting water containing vapor is discharged through the upper end of reactor 11 into conduit 26 and thence through branch conduit 27 and vent valve 28 therein for release to the atmosphere. When regeneration or reactivation of mass 12 is complete (i.e. no more water in the discharged gas), flow of regenerating gas through inlet conduit 20 and discharge conduit 26 is terminated.

When first reactor 10 becomes loaded with oxygen to the maximum desired level, the flows may be switched so as to place second reactor 11 on-stream and initiate the regeneration of first reactor 10. This point of operation may, for example, be recognized as a sudden increase in oxygen concentration of the product gas, i.e. breakthrough. Alternatively, the flows may be switched between the two reactors when first reactor 10 is only partially loaded with oxygen. Switchover is accomplished by closing valve 15 and opening valve 29 at the upper feed gas inlet end of the reactors, closing valve 17 and opening valve 30 at the lower product gas discharge end. To direct the regenerating gas to first reactor 10, valve 21 is closed and valve 31 is opened at the lower end of the reactors, while at the upper end valve 28 is closed and valve 32 in vent conduit 33 is opened.

Although preferred embodiments of this invention have been described in detail, it will be recognized that modifications may be made and that certain parts may be used separately, all within its scope. For example, the reduced iron or manganese oxide masses are effective in removing oxygen from multi-component gas mixtures, e.g. nitrogen-argon. Also, the material will remove moisture and carbon dioxide from gas mixtures in addition to oxygen as the primary impurity.

Although the invention has been described in detail in terms of a dynamic system in which oxygen-containing gas is passed at a positive pressure through a stationary bed of clay-bound reduced metal oxide pellets, it is equally suitable for the removal of oxygen from an environment by natural convection or diffusion of gas within that environment. For example, oxygen along with other gases may accumulate in the evacuated space between the inner and outer walls of a double-walled cryogenic liquid storage container, and the reduced copper, manganese or iron carbonates may be used to absorb the oxygen thereby avoiding loss of insulating quality. In this system the absorbent may be provided in bodies such as the mineral clay bound pellets.

A relatively large quantity of the selected metal carbonate may be activated by contact with a hydrogen-containing gas and then divided into smaller portions for charging into sealed capsules. The latter step should be performed in an oxygen-free protective atmosphere to avoid loss of absorption capacity. The capsules may then be individually joined to the cryogenic liquid container in a manner to permit gas communication with the evacuable space when desired.

One suitable arrangement is described in U.S. Patent No. 3,108,706 to L. C. Matsch et al., and employs a capsule made of glass which is enclosed in a chamber formed of ductile metal. After the capsule-chamber assembly has been installed on the outer wall in fluid communication with the evacuable space, the latter is evacuated so as to minimize atmospheric heat inleak to the stored cryogenic liquid. The chamber is then deformed so as to crush the capsule and establish communication between the activated metal oxide and the evacuated space. Any oxygen accumulating in such space will then be absorbed by the activated oxide.

What is claimed is:

1. A process for removing oxygen from an oxygen-containing environment comprising the steps of providing a compound selected from the group consisting of copper carbonate, manganese carbonate and iron carbonate; contacting the selected compound with a hydrogen-containing gas at elevated temperature below about 500° C. thereby reducing the selected carbonate to an oxide compound; and contacting the oxide compound with said oxygen-containing environment at substantially ambient temperature thereby absorbing the oxygen and oxidizing the oxide compound.

2. A process for removing oxygen from a feed gas mixture comprising the steps of providing bodies composed of a member selected from the group consisting of copper carbonate, manganese carbonate and iron carbonate, and mineral clay binder; contacting said bodies and a hydrogen-containing gas at elevated temperature below about 500° C. thereby reducing the selected carbonate to an oxide compound; purging said bodies with an inert gas to remove the residual hydrogen; thereafter contacting said feed gas mixture containing oxygen with the oxide compound-containing bodies at substantially ambient temperature thereby absorbing the oxygen and oxidizing the oxide compound; and separating the purified gas and the bodies.

3. A process according to claim 2 in which the feed gas mixture comprises oxygen and nitrogen, and the purified gas contains no more than about 0.1 p.p.m. oxygen.

4. A process according to claim 2 in which the feed gas mixture comprises oxygen and argon, and the purified gas contains no more than about 0.1 p.p.m. oxygen.

5. A process according to claim 2 in which the feed gas mixture comprises oxygen and hydrogen.

6. A process according to claim 2 in which the feed gas mixture comprises oxygen and methane.

7. A process according to claim 2 in which the feed gas mixture comprises oxygen and carbon monoxide.

8. A process for removing oxygen traces from a gas mixture comprising the steps of providing shaped compact bodies consisting essentially of iron carbonate and mineral clay binder; contacting said bodies and a hydrogen-containing gas at elevated temperature below about 500° C. thereby reducing the iron carbonate to iron oxide; purging said bodies with an inert gas to remove the residual hydrogen; thereafter contacting said gas mixture with the iron oxide-containing bodies at substantially ambient temperature thereby absorbing the oxygen traces and oxidizing the iron oxide; and separating the purified gas and the bodies.

9. A process for removing oxygen traces from a gas mixture comprising the steps of providing shaped compact bodies consisting essentially of manganese carbonate and mineral clay binder; contacting said bodies and a hydrogen-containing gas at elevated temperature below about 500° C. thereby reducing the manganese carbonate to manganous oxide; purging said bodies with an inert gas to remove the residual hydrogen-containing gas; thereafter contacting said gas mixture with the manganous oxide-containing bodies at substantially ambient temperature thereby absorbing the oxygen traces and oxidizing the manganous oxide; and separating the purified gas and the bodies.

10. A process for removing oxygen traces from a gas mixture comprising the steps of providing shaped compact bodies comprising copper carbonate and mineral clay binder; contacting said bodies and a hydrogen-containing gas at elevated temperature below about 200° C. thereby reducing the copper carbonate to copper oxide; purging said bodies with an inert gas to remove the residual hydrogen; thereafter contacting said gas mixture with the copper oxide-containing bodies at substantially ambient temperature thereby absorbing the oxygen traces and oxidizing the copper oxide; and separating the purified gas and the bodies.

11. A method for preparing an improved absorbent body comprising the steps of providing a first mixture of a member selected from the group consisting of copper carbonate, manganese carbonate and iron carbonate, and about 10 to 25 wt. percent mineral clay binder; mulling the constituents; adding and mixing about 20 to 30 wt. percent water to prepare a second mixture; drying the second mixture to about 1 to 3 wt. percent water; and thereafter contacting the dried second mixture with a hydrogen containing gas at elevated temperature below about 500° C. for sufficient duration to reduce the selected carbonate to an oxide compound and release carbon dioxide and water vapor as reaction products.

12. A method according to claim 11 in which the duration of the mulling step is about 30 minutes and the individual particles of the mulled first mixture are small enough to pass through a 50 mesh screen.

13. A method for preparing an improved absorbent body comprising the steps of providing a first mixture of iron carbonate and about 10 to 25 wt. percent mineral clay binder, mulling the constituents; adding and mixing about 20 to 30 wt. percent water to prepare a second mixture; forming a shaped compact body from said second mixture; drying the compact body to about 1 to 3 wt. percent water; thereafter contacting the dried compact body with a hydrogen-containing gas at elevated temperatures of about 500° C. for sufficient duration to reduce the iron carbonate to iron oxide and release carbon dioxide and water vapor as reaction products.

14. An improved absorbent body prepared by the method of claim 13.

15. A method for preparing an improved absorbent body comprising the steps of providing a first mixture of manganese carbonate and about 5 to 25 wt. percent mineral clay; mulling the constitutents; adding and mixing about 20 to 30 wt. percent water to prepare a second mixture; forming a shaped compact body from said second mixture; drying the compact body to about 1 to 3 wt. percent water; thereafter contacting the dried compact body with a hydrogen-containing gas at elevated temperature between about 350° and 500° C. for sufficient duration to reduce the manganese carbonate to manganous oxide.

16. A method for preparing an improved absorbent body comprising the steps of providing a first mixture of manganese carbonate and about 5–10 wt. percent bentonite clay; mulling the constitutents; adding and mixing about 25 wt. percent water to prepare a second mixture; extruding the second mixture into compact pellets; drying the pellets to about 2 wt. percent water content; contacting the dried pellets with nitrogen gas containing 10–15 mol percent hydrogen at elevated temperature between about 350° and 500° C. and a contact time of about 10 seconds to reduce the manganese carbonate to manganous oxide; purging the manganous oxide-containing pellets with nitrogen gas to remove the residual hydrogen.

17. An improved absorbent body prepared by the method of claim 16.

18. A methohd according to claim 15 in which rhodochrosite in said manganese carbonate.

19. A method for preparing an improved absorbent body comprising the steps of providing a first mixture of copper carbonate and about 5 to 25 wt. percent mineral clay; mulling the constitutents; adding and mixing about 20 to 30 wt. percent water to prepare a second mixture; forming a shaped compact body from said second mixture; drying the compact body to about 1 to 3 wt. percent water; thereafter contacting the dried compact body with a hydrogen-containing gas at elevated temperature below about 200° C. for sufficient duration to reduce the copper carbonate to copper oxide.

20. An improved absorbent body prepared by the method of claim 19.

21. A method according to claim 19 in which malachite is said copper carbonate.

References Cited

UNITED STATES PATENTS

| 1,207,708 | 12/1916 | Bosch et al. | 252—471 |
| 2,792,436 | 5/1957 | Kroeper et al. | 252—471 |
| 2,826,480 | 3/1958 | Webster | 23—2.1 |

FOREIGN PATENTS

| 529,307 | 8/1956 | Canada. |
| 49,138 | 7/1953 | India. |

MILTON WEISSMAN, *Primary Examiner.*

UNITED STATES PATENT OFFICE
CERTIFICATE OF CORRECTION

Patent No. 3,361,531                            January 2, 1968

Ezra Erb et al.

It is hereby certified that error appears in the above numbered patent requiring correction and that the said Letters Patent should read as corrected below.

Column 15, line 19, for "containing" read -- contacting --; line 53, for "temperatures" read -- temperature --; column 16, line 28, for "methohd" read -- method --; line 29, for "in" read -- is --.

Signed and sealed this 29th day of April 1969.

(SEAL)
Attest:

Edward M. Fletcher, Jr.                           EDWARD J. BRENNER

Attesting Officer                                    Commissioner of Patents